Oct. 13, 1931.  J. S. LITTLE  1,827,203
CELLULOSE CONTAINING ARTICLES AND METHOD OF PRODUCING SUCH ARTICLES
Filed Feb. 11, 1928

Inventor
John S. Little
by [signature] Att'y

Patented Oct. 13, 1931

1,827,203

UNITED STATES PATENT OFFICE

JOHN SHIRLEY LITTLE, OF LA GRANGE, ILLINOIS, ASSIGNOR TO WESTERN ELECTRIC COMPANY, INCORPORATED, OF NEW YORK, N. Y., A CORPORATION OF NEW YORK

CELLULOSE-CONTAINING ARTICLES AND METHOD OF PRODUCING SUCH ARTICLES

Application filed February 11, 1928. Serial No. 253,570.

This invention relates to cellulose-containing articles and methods of producing such articles.

Objects of the invention are the provision of cellulose-containing articles having electrical and mechanical properties which render them particularly suitable for insulating purposes and the provision of a simple, effective, and economical method of producing such articles.

In accordance with the general features of the invention as embodied in one form thereof, a fibrous material, such as paper pulp which contains cellulose, is thoroughly beaten in the presence of water until it becomes highly hydrated or gelatinized. The resulting material, either alone or mixed with a filler and/or a waterproofing material, is then extruded into the form desired and dried slowly under controlled conditions to prevent the formation of cracks due to shrinkage.

Figure 1:
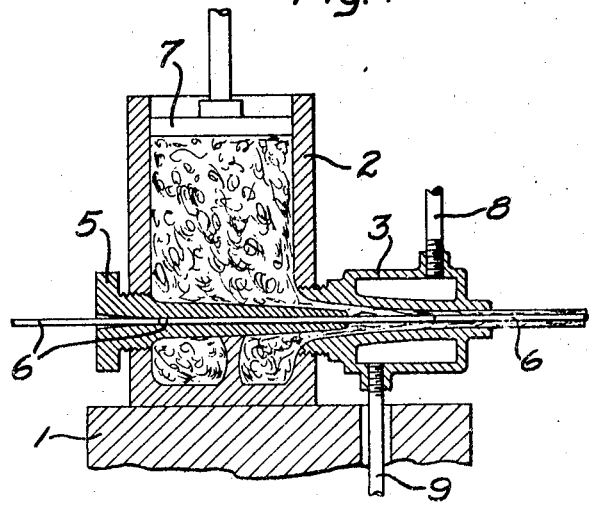
Figure 2:
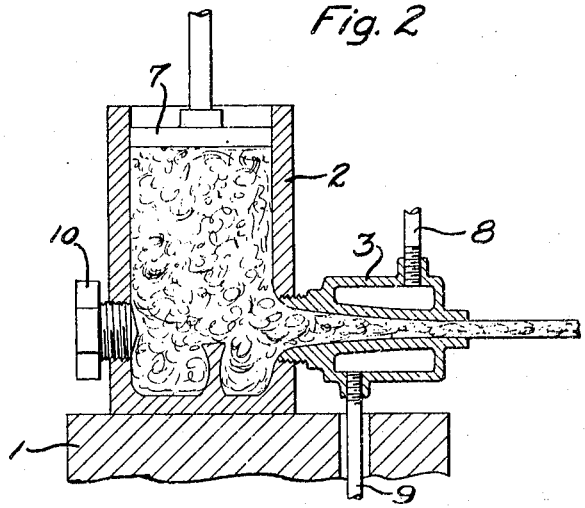

Other objects and features of the invention will be apparent from the following detailed description of the invention and the accompanying drawings, in which Fig. 1 is a vertical, longitudinal cross sectional view of an extrusion apparatus for use in making articles in accordance with the invention and which may be used in practicing the method, and Fig. 2 is a similar view of the extrusion machine adapted for use in making articles of another type.

In the drawings wherein like reference numerals are employed to denote similar parts in the various figures, Fig. 1 illustrates an extrusion apparatus by means of which tubes or other hollow articles made of cellulose- or other hollow articles made of cellulose-containing material may be made in accordance with the invention. In this figure, the numeral 1 indicates a base plate which supports a receptacle or chamber 2 which may be filled with a supply of a treated fibrous or pulpous material and a jacketed die member 3 is threaded into the wall of the chamber. Threaded into the chamber wall opposite to and extending partly into the die 3 is a hollow, truncated-cone-shaped core 5 designed to receive a series of rods or mandrels 6—6. A plunger 7 actuated by hydraulic or any other suitable means serves to extrude the treated fibrous or pulpous material from the chamber 2 through the die member 3, around the end of the core 5, and over the rods or mandrels 6—6. Steam or other suitable heating agents may be passed through the jacket of the die member 3 by means of the entrance and exit pipes 8 and 9, respectively, so that the material passing from the chamber 2 may be subjected to a substantially constant predetermined temperature while passing through the die member 3. To assist in pressing the material, the die 3 is so constructed that the diameter of the opening therethrough decreases gradually from the inner end thereof outwardly until a point near the outer end of the die is reached when the diameter of the opening becomes constant.

The machine illustrated in Fig. 1 may be modified, as shown in Fig. 2, for manufacturing rods, instead of tubes or other hollow articles, by removing the hollow core member 5 and substituting a threaded plug 10 therefor. When the extrusion apparatus is thus modified, the treated material may be forced through the die member 3 as a homogeneous cylindrical mass without a central opening.

In the manufacture of articles in accordance with the preferred embodiment of the invention, paper pulp or other cellulose-containing material is thoroughly beaten in water until it becomes highly hydrated or gelatinized. Satisfactory results have been obtained by beating about four to six parts of paper pulp in about ninety-six to ninety-four parts of water in a ball mill, beater or refiner for about forty-eight hours or more when the material loses substantially all of its fibrous nature and becomes substantially structureless and gelatinized due to the highly hydrated state which it then assumes. The thus treated material is then placed in the cylinder 2 of the extrusion apparatus and formed into either tubes or rods which are cut into suitable length as they emerge from the apparatus, after which the rods or tubes are dried. Since the material tends to shrink considerably during the drying operation, this step is preferably carried out under carefully controlled humidity and temperature conditions in order to maintain the shape of the article and to minimize the formation of cracks due to shrinkage. Satisfactory results have been obtained by slowly drying the material in a humid atmosphere over an extended period of time which varies with the size and shape of the article produced.

Instead of making the articles of the hydrated or gelatinized pulp alone, various other ingredients, such as filling and/or waterproofing or hardening materials, may be mixed therewith to facilitate extrusion, to reduce shrinkage and to render the final product more waterproof. For example, the hydrated or gelatinized pulp produced as described hereinbefore may be mixed with a quantity of a filling material, such as clay, sufficient to alter the composition of the treated pulp so that the water content of the mixture is about 80 per cent of the total composition. The resulting mixture may then be extruded and dried in a manner similar to that described above for the pure treated pulp. Other suitable filling materials which may be used instead of clay are wood flour, plaster of Paris, pulverized soapstone, chalk and other inert substances.

Instead of employing a filling material with the hydrated or gelatinized pulp, the material may be mixed with other materials which tend to harden or waterproof it. Among such materials are viscose, solutions of cellulose acetate, solutions of zinc chloride, etc. For example, paper pulp may be beaten in water until it is highly hydrated or gelatinized and the resulting material dehydrated until the water content is about 70 per cent of the total composition. A sufficient quantity of a 10 per cent viscose solution is then added to this material to bring the total liquid content of the resulting mixture up to 80 per cent, and the resulting mass of material is then extruded into the desired shape. The extruded article is then treated with one of the materials well known in the art, such as an acid bath, to set or precipitate the viscose, after which the article is dried under controlled conditions in the manner described previously.

It is also possible to produce satisfactory articles by employing with the gelatinized material both a filling material, such as clay, and a waterproofing material, such as viscose. In any case, when the hydrated or gelatinized material is employed in combination with other materials, the proportions of the other materials are so arranged that the liquid content of the mass to be extruded is approximately 80 per cent of the total composition.

Although in the specific embodiment of the invention described hereinbefore, paper pulp is indicated as the cellulose-containing material of which articles may be made in accordance with the invention, it is to be understood that other cellulose-containing materials, such as cotton, starch, etc., may be employed with satisfactory results and that the invention is limited only by the spirit and scope of the annexed claims.

Articles produced in accordance with the invention as described above are very dense and hornlike in character and have electrical and mechanical properties which render them particularly suitable for insulating purposes.

What is claimed is:

1. A method of producing articles, which consists in working four to six parts of fibrous material in ninety-six to ninety-four parts of water until it becomes highly hydrated, adding a sufficient quantity of a filling material thereto to alter the water content of the mixture to about 80%, and forming the resulting mixture into an article of the desired shape.

2. A method of producing articles, which consists in working four to six parts of fibrous material in ninety-six to ninety-four parts of water until it becomes highly hydrated, dehydrating the resulting mixture until the water content is about 70% of the total mixture, adding a sufficient quantity of a waterproofing material thereto to bring the liquid content of the mixture up to 80%, and forming the resulting mixture into an article of the desired shape.

3. A method of producing articles, which consists in working four to six parts of fibrous material in ninety-six to ninety-four parts of water until it becomes highly hydrated, adding sufficient quantities of a filling material and a waterproofing material thereto to bring the liquid content of the mixture up to 80%, and forming the resulting mixture into an article of the desired shape.

4. A method of producing articles, which consists in working four to six parts of fibrous material in ninety-six to ninety-four parts of water until it becomes highly hydrated, adding a sufficient quantity of a filling material thereto to alter the water content of the mixture to about 80%, forming the resulting mixture into an article of the desired shape, and drying the article in a humid atmosphere to minimize the formation of shrinkage cracks.

5. A method of producing articles, which consists in working four to six parts of fibrous material in ninety-six to ninety-four parts of water until it becomes highly hydrated, dehydrating the resulting mixture until the water content is about 70% of the total mixture, adding a sufficient quantity of a water-proofing material thereto to bring the liquid content of the mixure up to 80%, forming the resulting mixture into an article of the desired shape, and drying the article in a humid atmosphere to minimize the formation of shrinkage cracks.

6. A method of producing articles, which consists in working four to six parts of fibrous material in ninety-six to ninety-four parts of water until it becomes highly hydrated, adding sufficient quantities of a filling material and a waterproofing material thereto to bring the liquid content of the mixture up to 80%, forming the resulting mixture into an article of the desired shape, and drying the article in a humid atmosphere to minimize the formation of shrinkage cracks.

In witness whereof, I hereunto subscribe my name this 31st day of January A. D., 1928.

JOHN SHIRLEY LITTLE.